Figure 1:
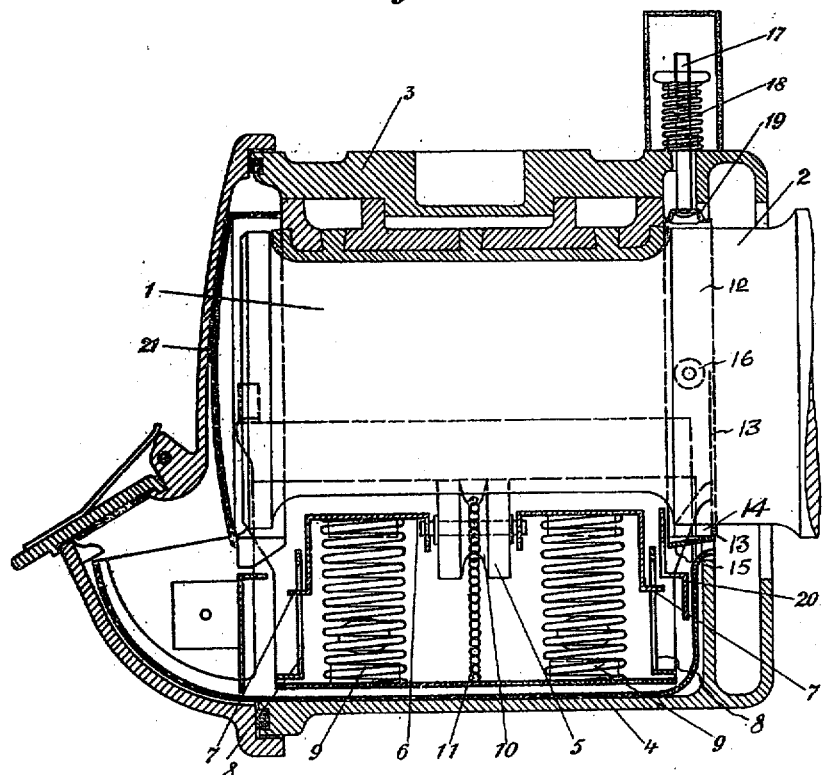

W. FRIEDRICH.
JOURNAL BOX.
APPLICATION FILED AUG. 23, 1920.

1,436,872.

Patented Nov. 28, 1922.
3 SHEETS—SHEET 1.

Inventor
Waldemar Friedrich
By [signature] Atty.

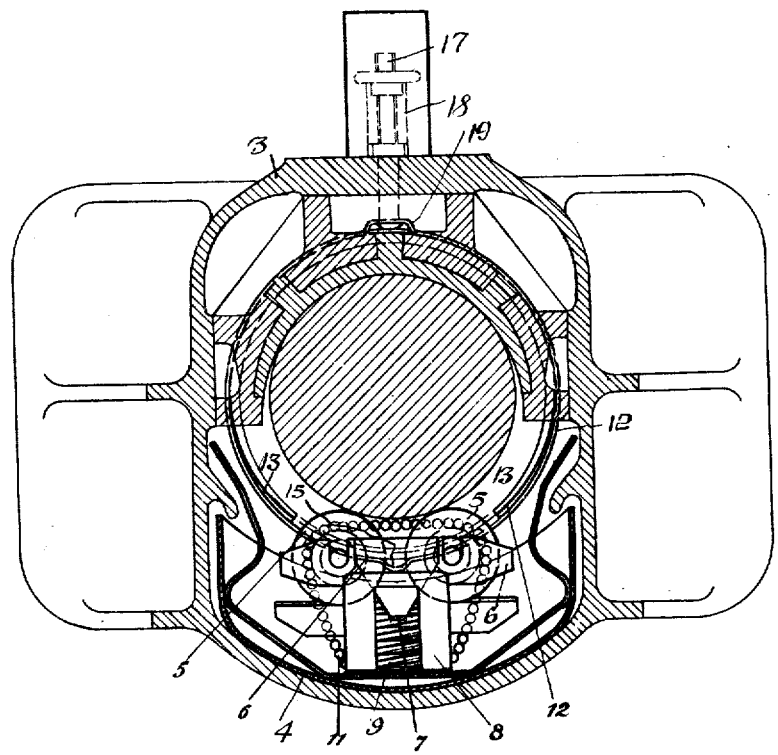

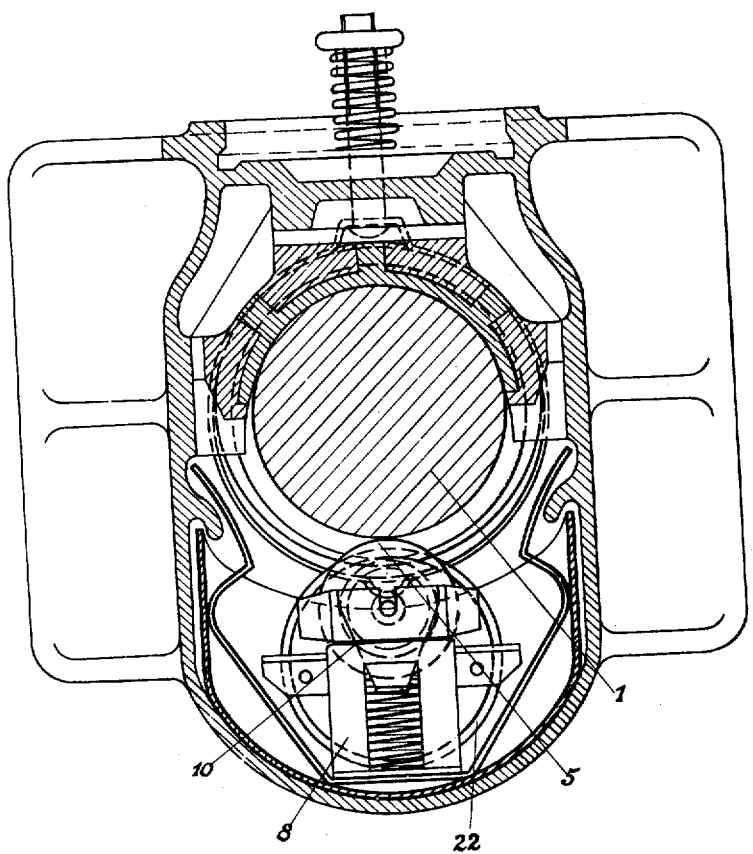

Patented Nov. 28, 1922.

1,436,872

UNITED STATES PATENT OFFICE.

WALDEMAR FRIEDRICH, OF KARLSRUHE, BADEN, GERMANY, ASSIGNOR TO THE FIRM OF DR. ING. V. C. A. SCHNEIDER, OF FRANKFORT-ON-THE-MAIN.

JOURNAL BOX.

Application filed August 23, 1920. Serial No. 405,551.

*To all whom it may concern:*

Be it known that I, WALDEMAR FRIEDRICH, a citizen of Germany, and resident of Karlsruhe, Baden, Germany, Sommerstrasse 12, have invented new and useful Improvements in Journal Boxes (for which I have filed applications in Germany, March 9, 1918, and October 14, 1918), of which the following is a specification.

This invention relates to means for lubricating bearings especially the journal bearings of railway vehicles, but also adapted to be used for bearings on other vehicles and also for the lubrication of any kind of axle journals or shafts. The lubrication is effected by lubricating rollers which are arranged to make contact with the under side of the journal and are rotated thereby. The lubricating oil is fed to these lubricating rollers by an endless chain, which hangs in a peripheral groove in each of the lubricating rollers, but does not contact with the axle journal. By this means a slower speed is imparted to the chain than the peripheral velocity of the rollers or journal, so that the oil in the feed vessel is not set in too rapid motion. The endless chain transmits to the lubricating rollers the oil which adheres to it, and these rollers in turn transmit the oil to the shaft journal. The chain itself is in the form of a short-link curb chain, that is to say a chain with twisted links, so that good adhesion of the oil thereto is ensured.

A frame carrying the rollers is free to move in all directions, so that the rollers can always adjust themselves accurately to the journal and for this purpose the frame is borne by two spiral springs which allow movement to take place both vertically and laterally on either side of the lubricating rollers. To limit these movements a guide frame is provided in which the frame carrying the rollers is guided by check brackets.

In this way ample lubrication of the axle journal is secured. The overflow and scattering of oil at the ends of the journal must, however, be prevented; and for this purpose a scraper, in the form of an oil-return ring, is provided between the journal and the shoulder of the axle. The diameter of this oil-return ring is greater than that of the journal, so that a distance between it and the journal is given on both sides and on the bottom of the ring. This ring is suspended from a spring, and a chamfered scraper portion thereof bears against the under side of the axle.

The rear edge of the bottom of the ring is turned up to about the middle, so that the oil flowing from the axle is returned to the oil vessel. The ring also bears against the axle by means of two lateral lugs, which hold the ring in the proper position in relation to the axle. A bracket secured on the oil vessel and engaging with the ring prevents the latter from moving sideways under the influence of heavy vibrations.

Finally, a cap arranged in front of the head of the axle journal collects the oil discharged there and returns it to the oil box.

In a modification of the invention the endless chain is replaced by a lubricating ring, which, like the chain, is suspended in a channel in the lubricating roller.

Figure 3:
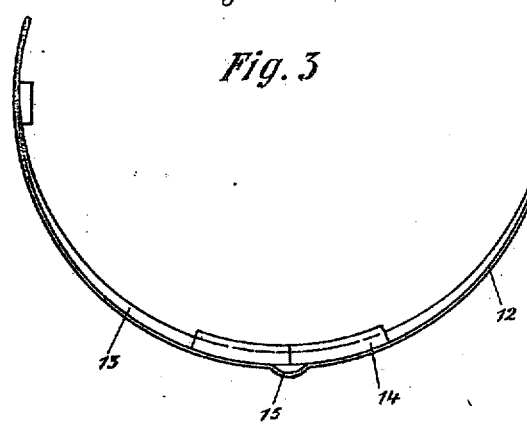
Figure 4:
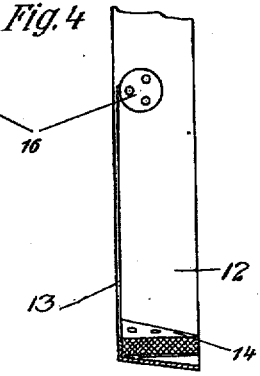

Two forms of the invention are illustrated in the accompanying drawings, Figure 1 being a sectional side elevation and Figure 2 a sectional front elevation of one form and Figure 3 an elevation of the lower portion of the oil-return ring shewn on a larger scale, Figure 4 being a central cross section thereof. Figure 5 is a sectional front elevation of the second form.

Referring first to Figures 1 to 4, 1 is the axle journal of a railway axle, the shoulder of the axle being indicated by 2. In the lower part of the axle box 3 is an oil vessel 4, in which two lubricating rollers 5 are rotatably mounted, their journals being carried in a frame 6 which engages, by means of check brackets 7, in frames 8 at the front and rear of the box. Two springs 9 constantly press the frame 6, and with it the lubricating rollers 5, 5 upwardly. The rollers 5, 5 however, are allowed sufficient play in all directions to enable them to adapt themselves to the axle journal under all conditions of torsion and vibration.

Each lubricating roller 5 is formed with a peripheral groove 10 in which the curb chain 11 is suspended. At its lowest part, this chain 11 dips into the oil in the oil vessel 4 and the rotation of the axle journal 1 causes the two lubricating rollers 5, 5 to turn as well, thus setting the chain 11 in rotation so that the chain carries oil from the oil vessel up with it into the groove 10, the upper part of which becomes completely filled with oil from which it is transmitted to the axle journal.

In order to prevent the escape and dispersion of the oil at the two ends of the axle journal, in front and rear, an oil-return ring is provided on the one side and a cap on the other. The oil-return ring is indicated at 12 and surrounds the rearward portion of the axle journal. As can be seen more particularly from Figures 3 and 4, its rear edge is bent up at 13 as far as about the middle of the ring. At its lowest part it carries a triangular or trapezoidal scraper 14, which bears against the shoulder 2 of the axle, and removes the oil thereon, so that the oil flows back into the oil vessel, the flow of the oil being assisted by a lip 15. At about the middle on either side, two lugs 16, 16 are provided on the inner face of the ring 12, by means of which the ring bears against the shoulder 2 of the axle, lateral play being thereby prevented. At its top the ring 12 hangs from a rod 17, which is supported on the shell of the bearing by means of a spring 18, thus ensuring elastic suspension of the ring. At its top, as at 19 the ring 12 lies above the shoulder of the axle, any oil thrown off there is caught by the ring and returned to the oil vessel. The bracket 20 mounted on the oil box prevents the ring 12 from swinging outward.

The scattering of oil at the outer end of the axle journal is prevented by a cap 21, which is mounted in the shell, or on the lid of same at a predetermined distance, from the journal, and catches the oil, which it returns to the oil vessel.

In the modification shewn in Figure 5, only a single lubricating roller 5 is provided, which contacts with the under side of the axle journal 1 and is supported by the same frame support and spring as in the first form. A lubricating ring 22, which dips down into the oil, is suspended in the groove 10 of the roller 5 and operates in the same way as the chain of the first form, carrying up with it oil from the oil vessel, filling the groove in the lubricating roller, and thus transmitting oil to the axle journal. To assist the adhesion of the oil to the ring, the latter may be provided with recesses, holes, slots or the like, of any kind.

Like the chain of the first form, the ring runs at a lower peripheral velocity than the lubricating roller itself.

I claim:

1. In a journal box for railway vehicles and the like, the combination of a plurality of lubricating rollers in contact with the journal and a feeding device for oil common to and in contact with said rollers, substantially as and for the purpose described.

2. In a journal box for railway vehicles and the like, the combination of a plurality of parallel, peripherally grooved lubricating rollers in contact with the journal, and a feeding device for the oil common to and in contact with said peripheral grooves of the lubricating rollers, substantially as and for the purpose set forth.

3. In a journal box for railway vehicles and the like, the combination of a plurality of substantially parallel, peripherally grooved lubricating rollers in contact with the journal, and a chain hanging in the peripheral grooves of said lubricating rollers, substantially as and for the purpose set forth.

4. In a journal box for railway vehicles and the like, the combination of a plurality of lubricating rollers arranged on a spring-frame, and a feeding device for the oil in contact with said lubricating rollers, substantially as and for the purpose described.

5. In a journal box for railway vehicles and the like, the combination of lubricating rollers arranged on a frame borne by a pair of spiral springs, and a single feeding device for the oil in contact with said lubricating rollers, substantially as and for the purpose described.

6. In a journal box for railway vehicles and the like, the combination of lubricating rollers, a frame for said rollers, a pair of spiral springs for said frame, a guide frame to limit the movement of said roller frame and a single feeding device for the oil in contact with said lubricating rollers, substantially as and for the purpose described.

7. In a journal box for railway vehicles and the like, the combination of lubricating rollers, a frame for said rollers, a pair of spiral springs, a guide frame, check brackets on said roller frame engaging in slots of said guide frame, and a single feeding device for the oil in contact with the lubricating rollers, substantially as and for the purpose described.

8. In a journal box for railway vehicles and the like, the combination of lubricating rollers, a frame for said rollers, spiral springs supporting said frame and a guide frame, check brackets on said roller frame engaging in slots of said guide frame and a single chain hanging in peripheral grooves of the lubricating rollers, substantially as and for the purpose described.

9. In a journal box for railway vehicles and the like, the combination of a plurality of lubricating rollers, a single feeding device for the oil in contact with said lubricating rollers, and oil-return devices at the ends of the journal, substantially as and for the purpose described.

10. In a journal box for railway vehicles and the like, the combination of lubricating rollers, a single feeding device for the oil in contact with said lubricating rollers, and an oil-return ring suspended between the journal and the shoulder of the axle, substantially as and for the purpose described.

11. In a journal box for railway vehicles and the like, the combination of lubricating rollers, a feeding device for the oil in contact with the lubricating rollers, and an oil-return ring provided with scrapers between the journal and the shoulder of the axle, substantially as and for the purpose described.

12. In a journal box for railway vehicles and the like, the combination of lubricating rollers, a feeding-device for the oil in contact with the lubricating rollers, and an oil-return ring provided with scrapers and turned up at the bottom of its rear edge, substantially as and for the purpose described.

13. In a journal box for railway vehicles and the like, the combination of lubricating rollers, a feeding device for the oil in contact with the lubricating rollers and a spring-suspended oil-return ring of greater diameter than the journal provided with scrapers and turned up at the bottom of its rear edge, substantially as and for the purpose described.

14. In a journal box for railway vehicles and the like, the combination of lubricating rollers, a feeding device for the oil in contact with the lubricating rollers and a spring-suspended oil-return ring of greater diameter than the journal provided with scrapers and lateral lugs and turned up at the bottom of its rear edge, substantially as and for the purpose described.

15. In a journal box for railway vehicles and the like, the combination of lubricating rollers, a feeding chain on the lubricating rollers and a spring-suspended oil-return ring of greater diameter than the journal provided with scrapers and lateral lugs and turned up at the bottom of its rear edge, substantially as and for the purpose described.

16. In a journal box, the combination with a frame, a coil spring at each end of said frame, a pair of oiling rollers mounted in said frame between said springs and means common to said rollers and moved thereby to supply oil to said rollers.

17. In a journal box, a scraper ring yieldingly suspended around the journal from said box, said ring of greater diameter than said journal, and a scraper on said ring at its bottom portion for scraping oil from the journal.

18. In a journal box for railway vehicles and the like, the combination of lubricating rollers, a feeding chain on the lubricating rollers, a spring-suspended oil-return ring of greater diameter than the journal provided with scrapers and lateral lugs, and turned up at the bottom of its rear edge, and a cap in front of the journal, substantially as and for the purpose described.

In testimony that I claim the foregoing as my invention, I have signed my name this fourteenth day of April, 1920.

WALDEMAR FRIEDRICH.